United States Patent
Sand (10) Patent No.: US 9,434,441 B1
(45) Date of Patent: Sep. 6, 2016

(54) MOTORCYCLE FRAME HEAD STOCK

(71) Applicant: Faster Faster Inc., San Francisco, CA (US)

(72) Inventor: Jeff Waldo Sand, San Francisco, CA (US)

(73) Assignee: Faster Faster Inc., Brisbane, CA (US)

( * ) Notice: Subject to any disclaimer, the term of this patent is extended or adjusted under 35 U.S.C. 154(b) by 0 days.

(21) Appl. No.: 14/823,575

(22) Filed: Aug. 11, 2015

Related U.S. Application Data (60) Provisional application No. 62/036,226, filed on Aug. 12, 2014.

(51) Int. Cl.
*B62K 19/32* (2006.01)
*B62K 19/20* (2006.01)
*B23K 31/02* (2006.01)

(52) U.S. Cl.
CPC ............... *B62K 19/32* (2013.01); *B23K 31/02* (2013.01); *B62K 19/20* (2013.01)

(58) Field of Classification Search
CPC ........ B62K 11/02; B62K 11/04; B62K 11/14
See application file for complete search history.

(56) References Cited

U.S. PATENT DOCUMENTS

| | | | | | |
|---|---|---|---|---|---|
| 4,613,146 | A | * | 9/1986 | Sharp | B62K 3/02 280/288.2 |
| 4,699,233 | A | * | 10/1987 | Koga | B62K 19/20 180/219 |
| 8,672,077 | B2 | * | 3/2014 | Sand | B62K 11/04 180/220 |
| 9,266,578 | B1 | * | 2/2016 | Eder | B62K 11/02 |
| 9,272,746 | B2 | * | 3/2016 | Inoue | B62K 19/06 |
| 2015/0375596 | A1 | * | 12/2015 | Blain | B60K 1/04 165/47 |

* cited by examiner

*Primary Examiner* — Kevin Hurley
(74) *Attorney, Agent, or Firm* — Fenwick & West LLP (57) ABSTRACT

A motorcycle frame includes a headstock assembly that allows for a more efficient assembly process of joining the headstock assembly to the motorcycle frame. The headstock assembly includes multiple headstock components that are welded to the frame. The design of the headstock assembly increases the surface area of the headstock assembly that is welded to the frame to increase rigidity.

20 Claims, 8 Drawing Sheets

MOTORCYCLE FRAME HEAD STOCK

CROSS-REFERENCE TO RELATED APPLICATIONS

This application claims the benefit of U.S. Provisional Patent Application No. 62/036,226, filed on Aug. 12, 2014 which is incorporated by reference in its entirety.

BACKGROUND

1. Field of Technology

The embodiments herein relate generally to motorcycle frames. More particularly, the embodiments herein relate to the design of a motorcycle frame head stock.

2. Description of the Related Art

Motorcycle frames are typically constructed from several smaller components, such as tubes, stampings, castings, and forgings. These components are then welded or otherwise fastened together in order to create a whole motorcycle frame. Motorcycle frames also typically comprise a head stock element near the front of the frame to which a front end assembly is mounted. The front end assembly comprises a fork and a front wheel. The head stock element is a cylindrical tube that allows the front end assembly to rotate side to side, allowing the rider of the motorcycle to steer the motorcycle. The head stock element is welded to two or more side elements. However, current head stock designs are difficult to weld in such a manner that prevents water from entering the side elements. The shape of tubular head stocks also result in a relatively small surface area that can be welded to side elements, resulting in high stress concentrations at the interface. Therefore, there is a need for a motorcycle frame head stock design that enables easier welding of the head stock to the side elements and decreases stress concentrations near the weld joint interface.

SUMMARY

A motorcycle frame is designed to more evenly distribute forces transmitted from the head stock to the rest of the frame. The design of the motorcycle frame also enables a more efficient assembly process of joining the head stock to the rest of the frame. In one embodiment, the head stock comprises top and bottom head stock elements which are joined to the rest of the frame after the rest of the frame is assembled. This design increases the surface area over which the head stock is welded to the rest of the frame and enables the head stock to be welded to the rest of the frame in multiple steps, making each weld joint interface easier to access.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The head stock assembly of a motorcycle frame allows the front end assembly to be mounted to the motorcycle frame such that the front end assembly can rotate left and right, steering the motorcycle. The head stock assembly is usually welded to the other components of the motorcycle frame. Typically, the front end assembly of a motorcycle comprises the front suspension fork and front wheel, and the front end assembly is mounted to the frame via tapered bearings or ball bearings. Force that is applied to the front end assembly (jump landings, braking, collisions, etc.) is transferred to the frame through the head stock assembly. Therefore, it is advantageous to maximize the area of the weld joint interface between the head stock assembly and the rest of the motorcycle frame, in order to more evenly distribute any transmitted forces. Additionally, since motorcycle frames usually use hollow components to reduce weight, it is advantageous to have fully sealed weld joint interfaces in order to prevent water from entering any of the hollow components.

Motorcycle Frame Design

Figure 1A:
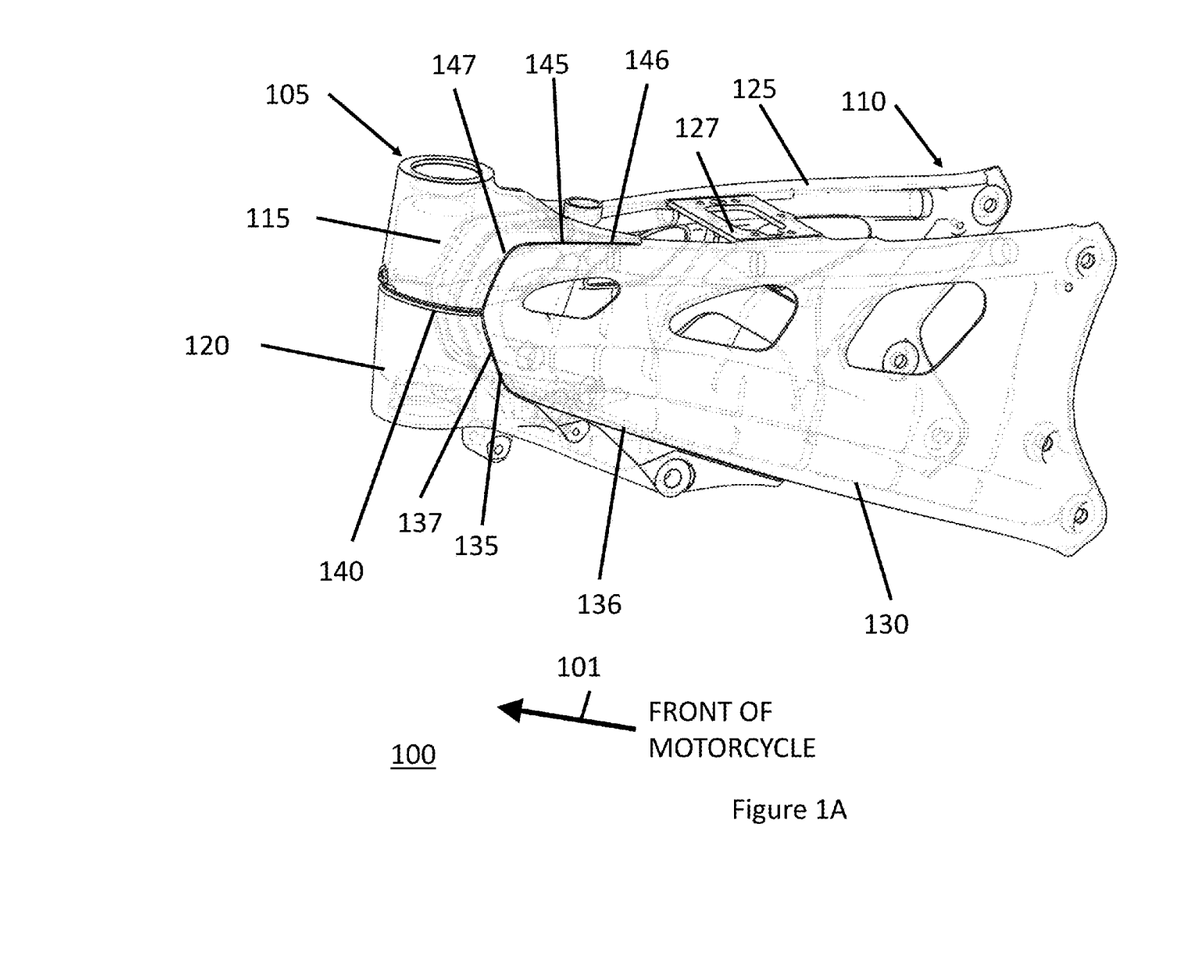
FIGS. 1A, 1B, and 1C are respectively a perspective view, a top view, and a bottom view of a motorcycle frame according to one embodiment.

FIG. 1A is a perspective view of a motorcycle frame according to one embodiment. The motorcycle frame 100 comprises a head stock assembly 105 and a side element assembly 110. As indicated by the arrow 101, the head stock assembly 105 is situated towards the front of the motorcycle, and the side assembly 110 is situated towards the rear of the motorcycle. The head stock assembly 105 further comprises a top head stock element (portion) 115 and a bottom head stock element 120. The head stock assembly 105 is further described below with reference to FIG. 4A and FIG. 4B.

The side element assembly 110 further comprises a right side element 125 and a left side element 130. In some embodiments, a second end 408 of the top head stock element 115 and the first end 423 of bottom head stock element 120 (described below in reference to FIG. 4A and FIG. 4B) are joined together at interface 140 located between the top head stock element 115 and the bottom head stock element 120. In one embodiment, an interface describes surfaces of different components of the motorcycle frame that are in contact with one another. For example, the interface 140 comprises a welded joint between the top head stock element 115 and bottom head stock element 120. The interface 140 may be semi-circular in shape when viewed from the top of the motorcycle, with the open end facing toward the rear of the motorcycle, due to the semi-cylindrical shape of the top head stock element 115 and bottom head stock element 120 (described below with reference to FIG. 4A and FIG. 4B). In some embodiments, the right side element 125 and left side element 130 are welded together along interface 205 (visible in FIG. 2). The interface 205 comprises a welded joint. Viewed from the left side of the motorcycle, the interface 205 may be roughly semi-circular in shape open toward the rear of the motorcycle. In some embodiments, the semi-circular shape of interface 205 may comprise four linear segments 206 as will be further described below.

The head stock assembly 105 is welded to the side element assembly 110. For example, the bottom head stock element 120 is welded to the side element assembly 110 along interface 135, and the top head stock element 115 is welded to the side element assembly 110 along interface 145. The interface 135 may be roughly L-shaped with two distinct linear segments 136 and 137. The linear segment 137 extends downwards and rearwards from the first end 423 of bottom head stock element 120. The linear segment 136 extends downwards and rearwards from the linear segment 137. The interface 145 may be roughly L-shaped with two distinct linear segments 146 and 147. The linear segment 147 extends upwards and rearwards from the second end 408 of top head stock element 115. The linear segment 146 extends upwards and rearwards from the linear segment 147. In some embodiments, the right side element 125 may also comprise a reinforcing bridge 127 (further described below with reference to FIG. 3).

In some embodiments, the head stock assembly 105 and side element assembly 110 are made from forged aluminum alloy. In other embodiments, the head stock assembly 105 and side element assembly 110 may be made from cast aluminum, steel, titanium, or various other metals and non-metals formed using a variety of different methods, such as machining and casting.

Figure 1B:
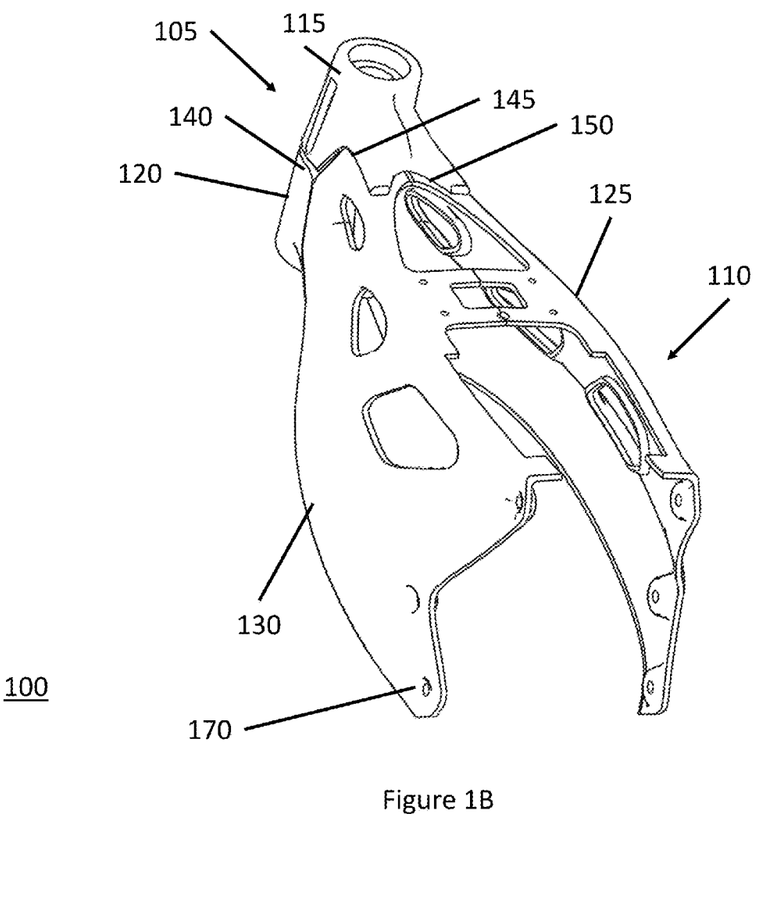

FIG. 1B is a top view of the motorcycle frame depicted in FIG. 1A according to one embodiment. As described above with reference to FIG. 1A, the motorcycle frame 100 comprises the head stock assembly 105 and the side element assembly 110. The head stock assembly 105 further comprises the top head stock element 115 and the bottom head stock element 120 described above. In addition to the interface 145, the top head stock element 115 is welded to the side element assembly 110 at a top surface of the side element assembly 110 along interface 150, which follows the U-section 411 of the top head stock element 115 (further described below with reference to FIG. 4A and FIG. 4B).

As mentioned above, the side element assembly 110 comprises the left side element 130 and the right side element 125. The left side element 130 and right side element 125 may further comprise one or more mounting holes 170. The mounting holes 170 may be machined, cast, or otherwise formed into the left side element 130 and the right side element 125. The mounting holes 170 may be used to secure the side element assembly 110 to a rear portion of the motorcycle frame via bolts or other mounting hardware.

Figure 1C:
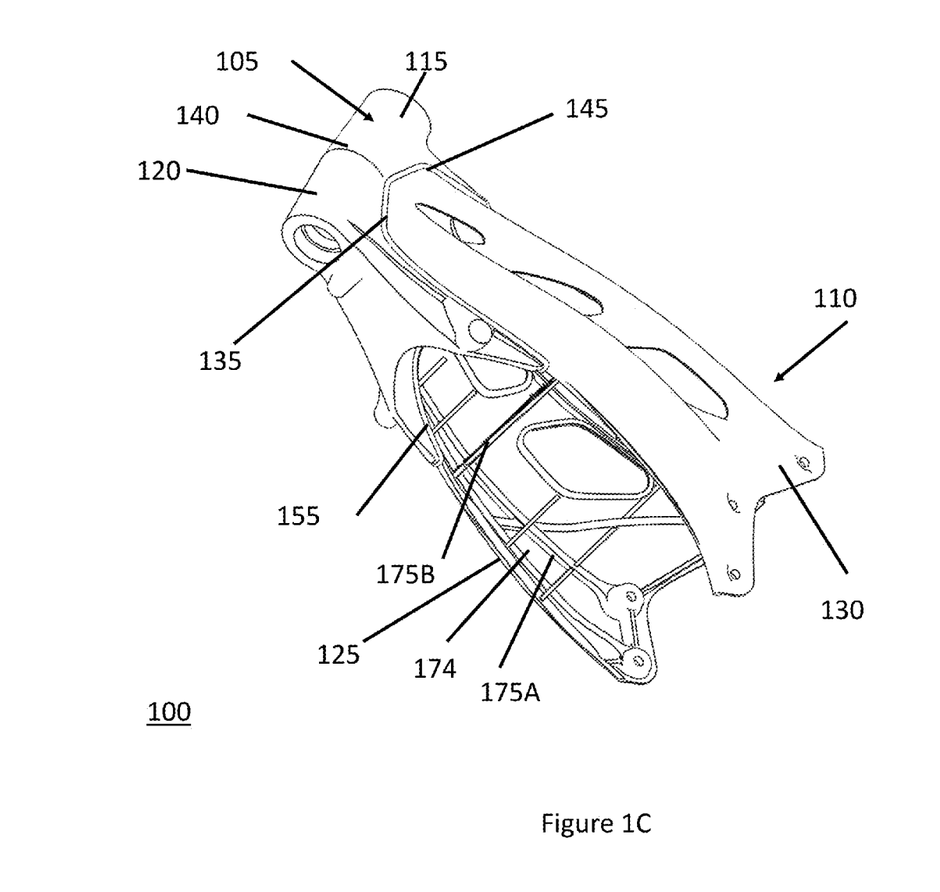

FIG. 1C is a bottom view of the motorcycle frame depicted in FIG. 1A according to one embodiment. In addition to the interface 135, the bottom head stock element 120 is welded to the side element assembly 110 at a bottom surface of the side element assembly 110 along interface 155, which follows the U-section 426 of the bottom head stock element 115 (further described below with reference to FIG. 4A and FIG. 4B). The right side element 125 may further comprise reinforcing ribs 175 and an inner surface 174. The reinforcing ribs 175A and 175B extend roughly perpendicularly from the inside surface 174 of the right side element 125. In some embodiments, the reinforcing ribs 175A are formed in a direction roughly perpendicular to the reinforcing ribs 175B, forming a grid like structure. In some embodiments, the reinforcing ribs 175 extend no more than 5 mm from the inner surface 174. In some embodiments, the reinforcing ribs 175 serve to increase the stiffness of the right side element 125. In some embodiments, the left side element 130 comprises reinforcing ribs similar to the reinforcing ribs 175 of the right side element 125.

Figure 2:
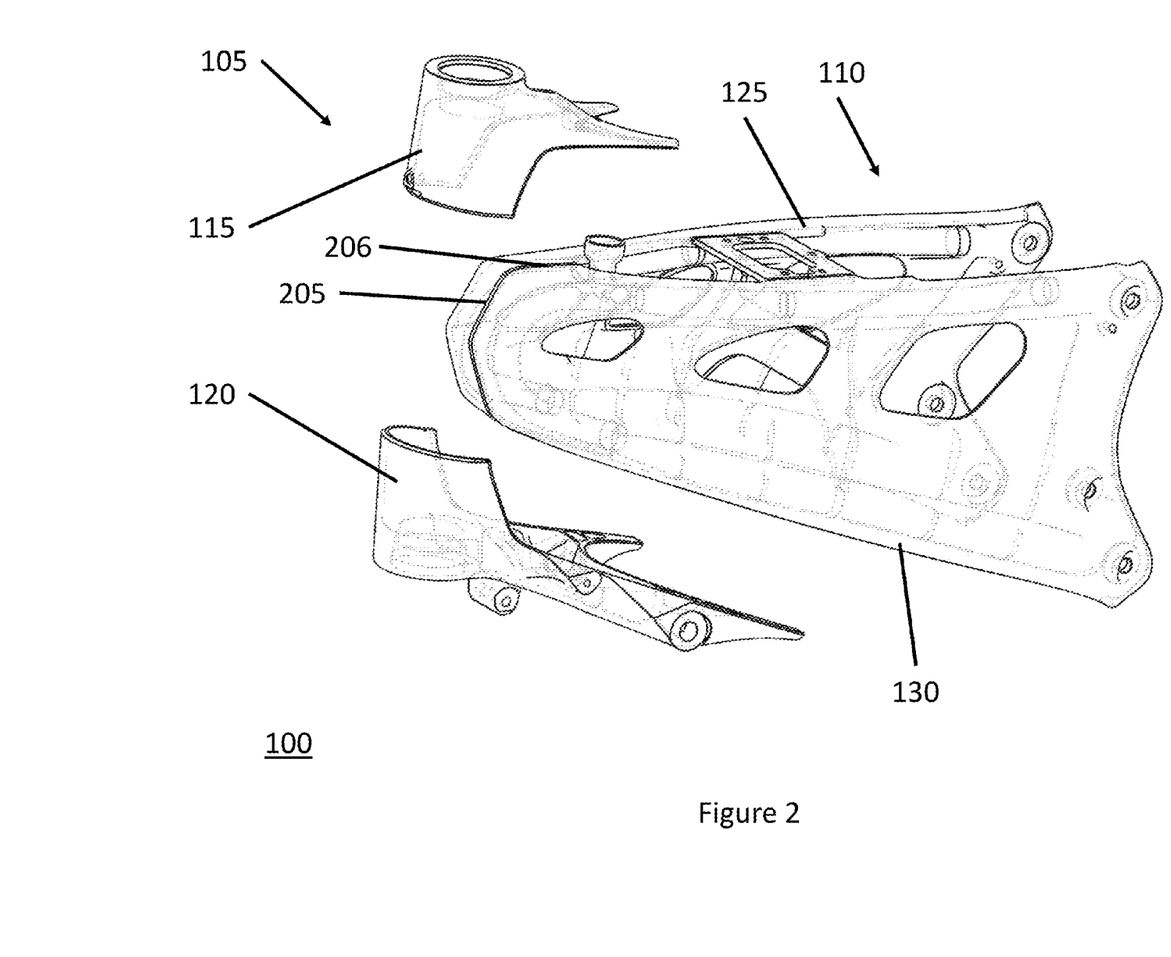
FIG. 2 is a partially exploded view of the motorcycle frame according to one embodiment.

FIG. 2 is a partially exploded view of the motorcycle frame according to one embodiment. The motorcycle frame 100 comprises the head stock assembly 105 and the side element assembly 110. The side element assembly 110 further comprises the right side element 125 and the left side element 130. In some embodiments, the right side element 125 is welded to the left side element 130 along interface 205 such that the joining face 126 (visible in FIG. 3) of the right side element 125 is flush with the joining face 131 (visible in FIG. 3) of the left side element 130.

Figure 3:
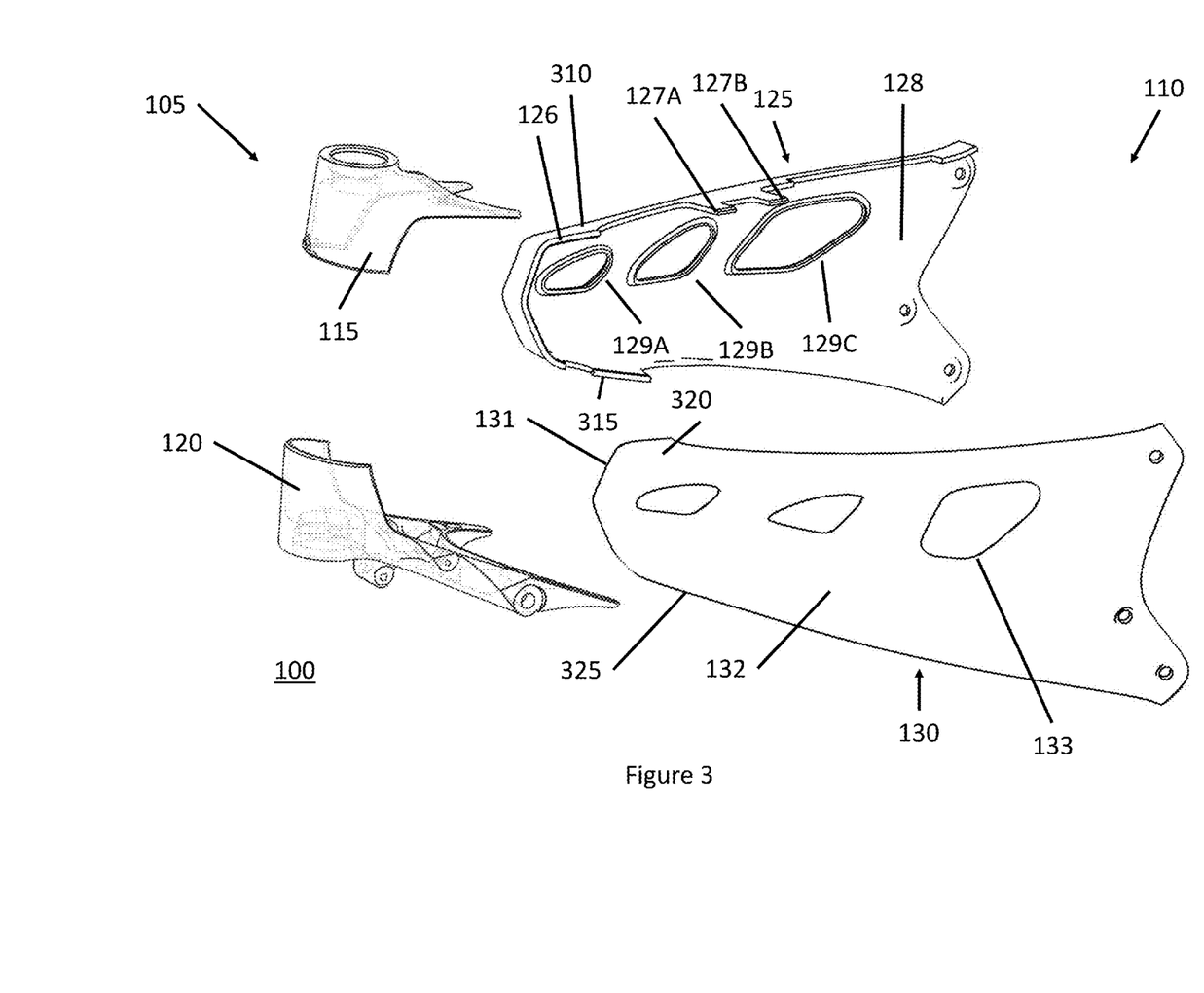
FIG. 3 is an exploded view of the motorcycle frame according to one embodiment.
Figure 5:
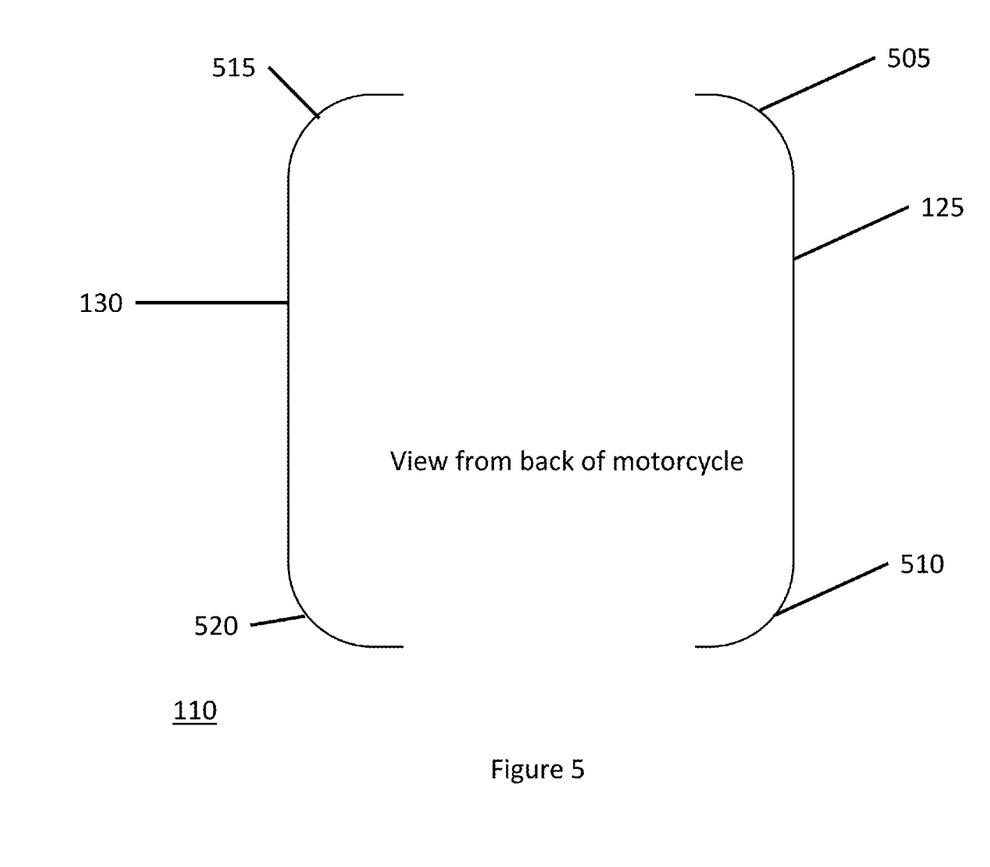
FIG. 5 is a cross sectional view of a side element assembly according to one embodiment.

FIG. 3 is an exploded view of the motorcycle frame 100 according to one embodiment. The motorcycle frame 100 comprises the head stock assembly 105 and the side element assembly 110. The side element assembly 110 further comprises the right side element 125 and the left side element 130. The right side element 125 further comprises a main body 128 a joining face 126, a top surface 310 and a bottom surface 315 (not visible). The joining face 126 is a surface of the right side element 125 that connects to a joining face 131 of the left side element 130. The main body 128 is a relatively flat panel structure that extends rearward away from the head stock assembly 105. In some embodiments, the main body 128 may have a concave structure curving towards the left side element 130, as depicted in FIG. 5. The joining face 126 has a C-shaped profile with the open end facing towards the rear of the motorcycle. The top surface 310 is a relatively flat portion of the right side element 125 that is roughly parallel to the ground. In some embodiments, the top surface 310 extends the along the entire length of the right side element 125. The bottom surface 315 is a relatively flat portion of the right side element 125 that is roughly parallel to the ground. In some embodiments, the bottom surface 315 extends the along the entire length of the right side element 125. In some embodiments, the right side element 125 also comprises a reinforcing bridge 127 that extends from the right side element 125. The reinforcing bridge 127 is joined with a reinforcing bridge extending from the left side element 130 (not shown in FIG. 3). The reinforcing bridge 127 is a structure that extends roughly perpendicularly from the right side element 125 towards the left side element 130. In some embodiments, the reinforcing bridge 127 comprises a first extension 127A and a second extension 127B. The first extension 127A and second extension 127B may result from forming a hole 305 in the center of the reinforcing bridge 127. The reinforcing bridges of the right side element 125 and the left side element 127 rigidly connects the right side element 125 and left side element 130 together and adds structural integrity to the frame 100. In some embodiments, the reinforcing bridge is a continuous extension of the right side element 125 and the left side element 127. In other embodiments, the reinforcing bridge is a flat plate that is welded or otherwise fixed to the right side element 125. In some embodiments, holes 129 are formed in the main body 128. The holes 129 may be roughly polygonal in shape. For example, the first hole 129A and second hole 129B may comprise three sides, and the third hole 129C may comprise four sides. The holes 129 reduce the overall mass of the right side element 125. In some embodiments, the holes 129 allow increased airflow to components contained within the motorcycle frame 100.

The left side element 130 further comprises a main body 132, a joining face 131 (not visible), a top surface 320, and a bottom surface 325 (not visible). Like the main body 128 of the right side element 125, the main body 132 is a relatively flat panel structure that extends rearward from the head stock assembly 105. In some embodiments, the main body 132 may have a concave structure curving towards the right side element 125, as depicted in FIG. 5. The joining face 131 has a C-shaped profile with the open end facing towards the rear of the motorcycle. The top surface 320 is a relatively flat portion of the left side element 130 that is roughly parallel to the ground. In some embodiments, the top surface 320 extends the along the entire length of the left side element 130. The bottom surface 325 is a relatively flat portion of the left side element 130 that is roughly parallel to the ground. In some embodiments, the bottom surface 325 extends the along the entire length of the left side element 130. Although not depicted, in some embodiments the left side element 130 also comprises a reinforcing bridge similar to the reinforcing bridge 127 of the right side element 125. In some embodiments, the reinforcing bridge 127 of the right side element 125 is welded or otherwise attached to the reinforcing bridge of the left side element 130. In other embodiments, neither the right side element 125 nor the left side element 130 comprises an integrated reinforcing bridge, but a separate reinforcing bridge is mounted in between the right side element 125 and the left side element 130. Similar to the right side element 125, the left side element 130 may comprise holes 133 in the main body 132.

Figure 4A:
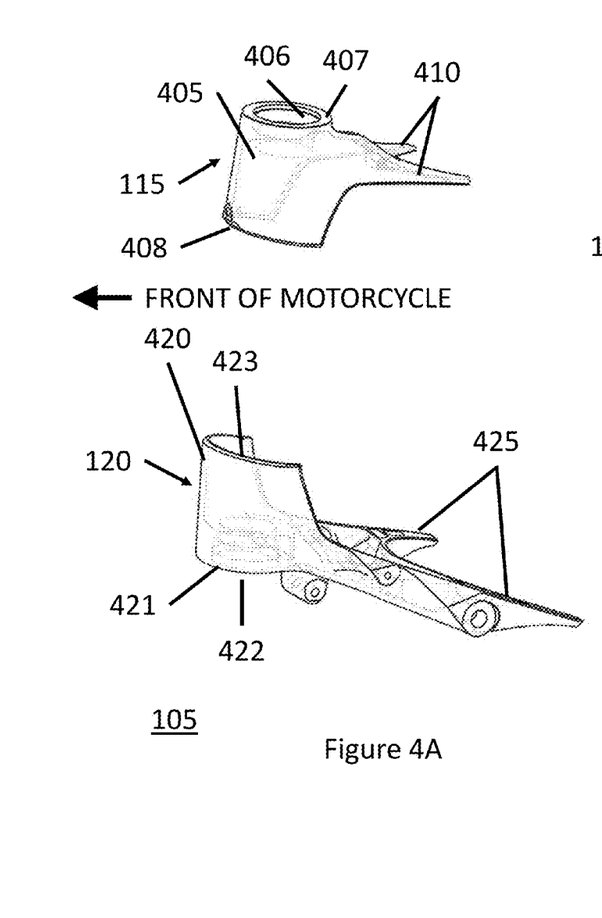
FIGS. 4A and 4B are exploded views of a head stock assembly according to one embodiment.

FIG. 4A is an exploded view of a head stock assembly 105 according to one embodiment. Generally, the head stock assembly 105 is shaped to allow a steering stem to be inserted into the head stock assembly 105. The top head stock element 115 is formed to include a top tubular section 405, a first end 407, a second end 408, and top rear extensions 410 that extend from the first end of the to head stock element 115 towards the rear of the motorcycle frame. The top tubular section 405 is a side surface of the top head stock element 115 that is located between the first end 407 and the second end of the top head stock element 115. As shown in FIG. 4A, the first end 407 of the top head stock element 115 includes a hole for the steering stem to be inserted into the head stock element 115. In some embodiments, the top tubular section 405 is roughly semi-cylindrical with an open side facing the rear of the motorcycle. A bearing seat 406 is formed into the top of the top tubular section 405 at the first end such that a bearing, e.g., a tapered roller bearing, can be mounted in the bearing seat 406. In some embodiments, the bearing seat 406 is a cylindrical cavity formed into the first end 407 of the top head stock element 115. In some embodiments, the bearing seat 406 is machined into the top head stock element 115. The bearing inserted into bearing seat 406 enables the front end assembly of the motorcycle (front wheel, suspension fork, etc.) to pivot from left to right, steering the motorcycle.

Figure 4B:
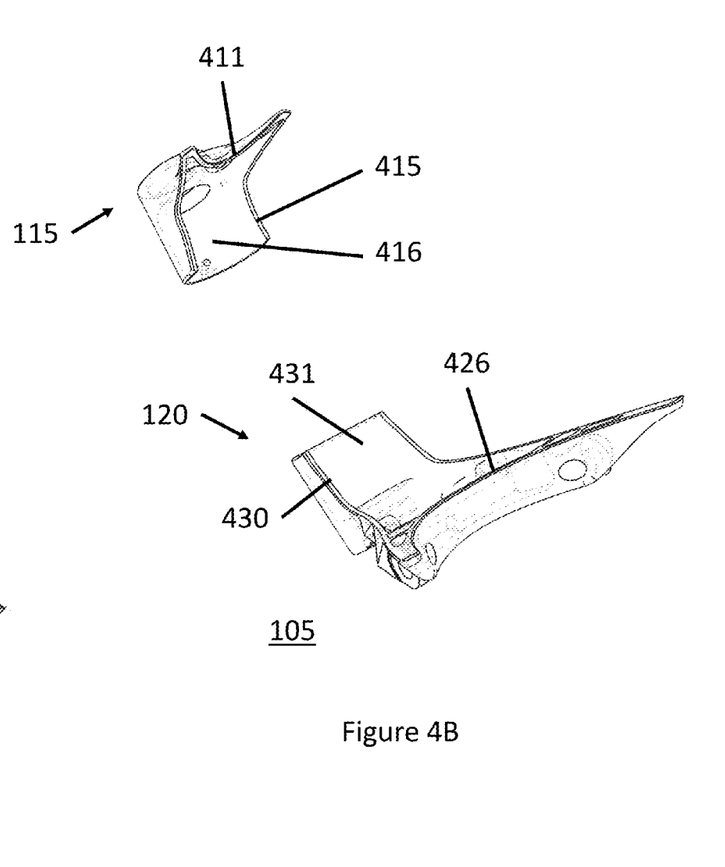

FIG. 4B is an exploded view of a head stock assembly according to one embodiment. A hollow cavity 416 is formed inside the top head stock element 115. The rear side 415 of the top head stock element 115 is open, revealing the hollow cavity 416. The hollow cavity 416 is positioned opposite the top tubular section 405. The top rear extensions 410 extend towards the rear of the motorcycle. In some embodiments, the top head stock element 115 includes two top rear extensions 410 (e.g., a first top rear extension and a second top rear extension). The rear extensions 410 are triangular in shape. Furthermore, referring back to FIG. 4B, the two top rear extensions 410 form a U-section 411 (e.g., a u-shaped curve) at an intersection between the top rear extensions 410.

Referring back to FIG. 4A, the bottom head stock element 120 is formed to include a bottom tubular section 420, a first end 423, a second end 422, and bottom rear extensions 425. The second end includes a hole for the steering stem. When the top head stock element 115 and the bottom head stock element 120 are welded together, the holes of the top head stock element 115 and the bottom head stock element 120 are aligned. In some embodiments, the bottom tubular section 420 is roughly semi-cylindrical with an open side facing the rear of the motorcycle. The bottom tubular section 420 is a side surface of the bottom headstock element 120 that is located between the first end 423 and the second end 421 of the bottom head stock element 420 and is cylindrically shaped. A bearing seat 421 (not visible) is formed into the second end 422 of the bottom tubular section 420 such that a bearing, such as a tapered roller bearing, can be mounted in the bearing seat 421. The bearing inserted into bearing seat 421 enables the front end assembly of the motorcycle (front wheel, suspension fork, etc.) to pivot from left to right, steering the motorcycle. In some embodiments, the bearing seat 421 is similar in shape to the bearing seat 406 of the top head stock element 115. In some embodiments, the front end assembly of the motorcycle comprises a steering stem. The steering stem is a roughly cylindrical component that is inserted through the two bearings mounted in bearing seat 421 and bearing seat 406. Steering stems are well understood in the related field and will not be described further herein. In FIG. 4B, a hollow cavity 431 is formed inside the bottom head stock element 120. The rear side 430 of the bottom head stock element 120 is open, revealing the hollow cavity 431. The hollow cavity 431 is positioned opposite the bottom tubular section 420. The bottom rear extensions 425 extend towards the rear of the motorcycle. In some embodiments, the bottom head stock element 120 includes two bottom rear extensions 425 (e.g., a first bottom rear extension and a second bottom rear extension). In one embodiment, the bottom rear extensions 425 are triangular in shape. The two bottom rear extensions 425 may also form a U-section 426 (e.g., a u-shaped curve) at an intersection between the bottom rear extensions 425.

In some embodiments, the top head stock element 115 and bottom head stock element 120 are made of forged aluminum alloy. In other embodiments, the head stock assembly 105 and side element assembly 110 may be made from cast aluminum, steel, titanium, or various other metals and non-metals. The head stock assembly 105 and side element assembly 110 are formed to include the various elements described herein using a variety of different methods, such as machining and casting.

The hollow cavities 416 (top head stock element 115) and 431 (bottom head stock element 120) advantageously make the head stock assembly 105 lighter while maintaining sufficient rigidity and strength. The top rear extensions 410 and bottom rear extensions 425 advantageously increase the surface area of the head stock assembly 105 that can be welded or otherwise fastened to the side element assembly 110. Increasing the welding or fastening surface area between the head stock assembly 105 and the side element assembly 110 advantageously distributes force more evenly and over a greater area when force is transmitted from the head stock assembly 105 to the side element assembly 110.

FIG. 5 is a cross sectional view of a side element assembly, viewed from the rear of the motorcycle, according to one embodiment. The side element assembly 110 comprises a right side element 125 and a left side element 130. In some embodiments, the right side element 125 has a concave form, with the top 505 and bottom 510 of the right side element 125 bending towards the left side element 130. In some embodiments, the left side element 130 has a concave form, with the top 515 and bottom 520 of the left side element 130 bending towards the right side element 125.

Method of Manufacture

The design of the motorcycle frame described above with reference to FIGS. 1 through 5 enable the motorcycle frame 100 to be assembled more efficiently. Specifically, the process of welding the head stock assembly 105 to the side element assembly 110 is made easier because the multiple interfaces are more accessible by a welding implement.

Figure 6:
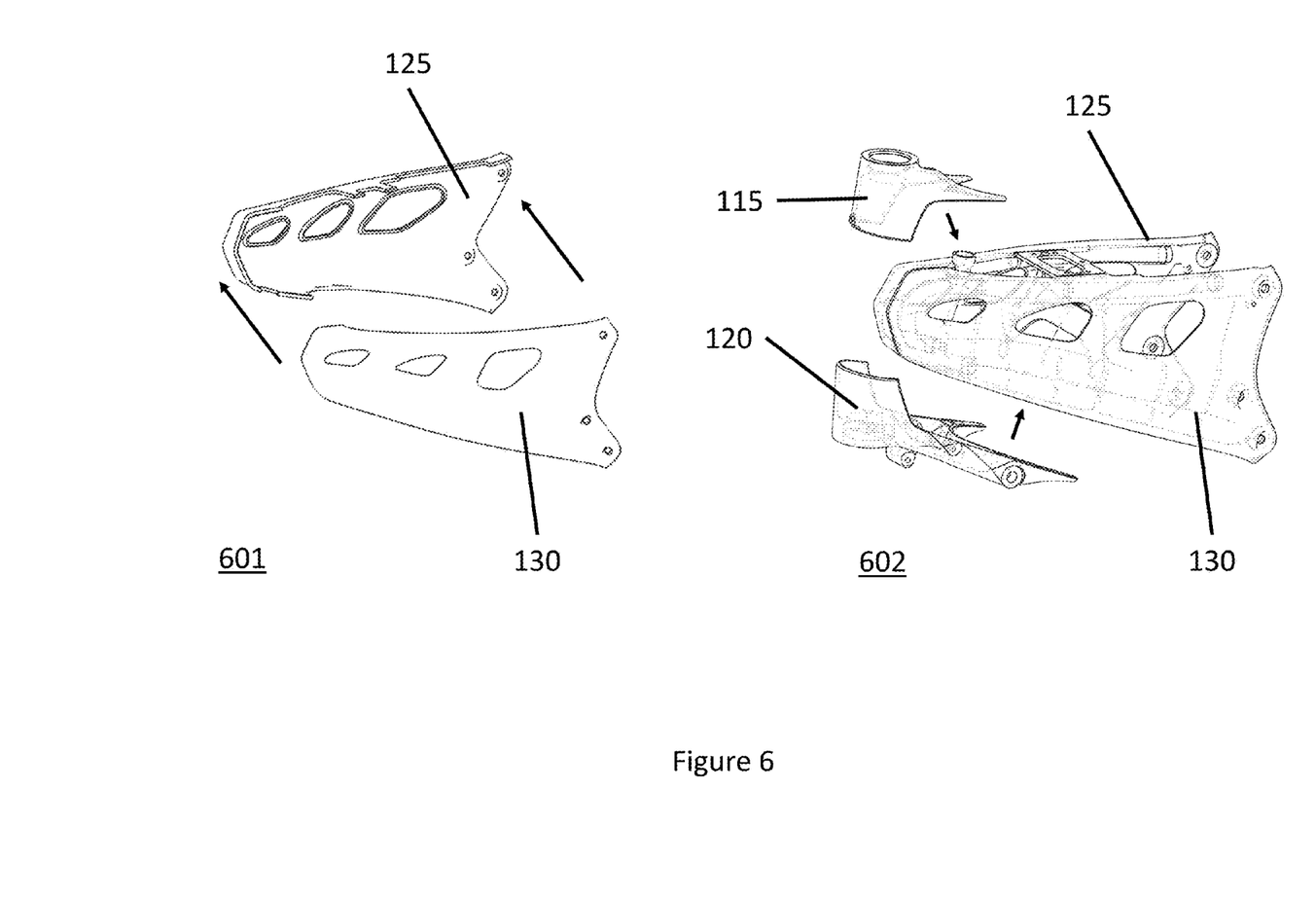
FIG. 6 illustrates a method of manufacturing the motorcycle frame according to one embodiment.

FIG. 6 illustrates a method of manufacturing the motorcycle frame 100 according to one embodiment. In the first step 601, the right side element 125 and left side element 130 are joined together such that joining edge 126 of the right side element 125 and the joining edge 131 of the left side element are mechanically in contact with each other (described above with reference to FIG. 3). In some embodiments, the right side element 125 and left side element 130 are welded together along interface 205 located along the joining edges 126 and 131. In the second step 602, the top head stock element 115 and bottom head stock element 120 are connected to the side element assembly 110. In some embodiments, the top head stock element 115 is welded to the side element assembly 110 along the interface 145 (FIG. 1A) and interface 150 (FIG. 1B), and the bottom head stock element 120 is welded to the side element assembly 110 along the interface 135 (FIG. 1A) and interface 155 (FIG. 1C). The interface 150 joins the top head stock element 115 to the top surface 310 of right side element 125 and top surface 320 of the left side element 130. The interface 155 joins the bottom head stock element 120 to the bottom surface 315 of right side element 125 and bottom surface 325 of left side element 130. In some embodiments, the top head stock element 115 is also welded to the bottom head stock element 120 along the headstock interface 140.

The method of manufacture described above advantageously allows the interface 205 (FIG. 2) of the side element assembly 110 to be accessed and welded from the direction towards the front of the motorcycle, before the joint 205 is covered and made inaccessible by the head stock assembly 105. Once the right side element 125 and left side element 130 are welded together, the welds required to attach the head stock assembly 105 to side element assembly 110 are all easily accessible (interfaces 135, 140, 145, 150, and 155) from the exterior of the frame 100. The frame design and method of manufacture described above also advantageously allow the interfaces 135, 140, 145, 150, and 155 to completely seal the interior cavities 416 and 431 of the head stock assembly 105, preventing water from entering the interior of the head stock assembly 105. Sealing the head stock assembly 105 aids in preventing rust and other environmental corrosion that may otherwise occur to the bearings that are inserted in the bearing seats 406 and 421. Sealing the head stock assembly 105 also generally prevents water from collecting and pooling in the head stock assembly.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A motorcycle frame comprising:
a headstock assembly shaped for insertion of a steering stem, the headstock assembly formed to include a plurality of extensions that extend towards a rear of the motorcycle frame; and
a plurality of side panels, wherein the extensions of the headstock assembly are welded to the plurality of side panels and the welds extend towards the rear of the motorcycle frame.

2. The motorcycle frame of claim 1 wherein the headstock assembly comprises a top headstock portion and a bottom headstock portion, the top head stock portion welded to the bottom headstock portion.

3. The motorcycle frame of claim 2, wherein the top headstock portion includes a top end and a bottom end, the top end including a hole for the steering stem.

4. The motorcycle frame of claim 3, wherein a side surface of the top headstock portion located between the top end and the bottom end of the top headstock portion is cylindrically shaped.

5. The motorcycle frame of claim 4, wherein the top headstock portion includes a hollow cavity opposite the side surface of the top headstock portion.

6. The motorcycle frame of claim 4, wherein the plurality of extensions include a first extension and a second extension that extend from the top end of the top headstock portion towards the rear of the motorcycle frame.

7. The motorcycle frame of claim 6, wherein the first extension and the second extension are triangular in shape and form a u-shaped curve at an intersection between the first extension and the second extension.

8. The motorcycle frame of claim 7, wherein the bottom head stock portion includes a top end and a bottom end, the bottom end including a hole for the steering stem.

9. The motorcycle frame of claim 8, wherein the bottom end of the top headstock portion is welded to the top end of the bottom headstock portion and wherein the hole included in the top headstock portion is aligned with the hole included in the bottom end of the bottom headstock portion.

10. The motorcycle frame of claim 9, wherein a side surface of the bottom headstock portion located between the top end and the bottom end of the bottom headstock portion is cylindrically shaped.

11. The motorcycle frame of claim 10, wherein the bottom headstock portion includes a hollow cavity opposite the side surface of the bottom headstock portion.

12. The motorcycle frame of claim 10, wherein the plurality of extensions including a third extension and a fourth extension that extend from the bottom end of the bottom headstock portion towards the rear of the motorcycle frame.

13. The motorcycle frame of claim 12, wherein the third extension and the fourth extension are triangular in shape and form a u-shaped curve at an intersection between the third extension and the fourth extension.

14. The motorcycle frame of claim 13, wherein the plurality of side panels comprise a first side panel and a second side panel, the first side panel and a second side panel each including a top surface and a bottom surface.

15. The motorcycle frame of claim 14, wherein the first extension and the second extension of the top headstock portion are welded to the top surfaces of the first side panel and the second side panel, and wherein the third extension and the fourth extension of the bottom headstock portion are welded the bottom surfaces of the first side panel and the second side panel.

16. The motorcycle frame of claim 14, wherein the first side panel and the second side panel each include a joining edge and wherein the joining edges of the first side panel and the second side panel are welded together.

17. The motorcycle frame of claim 16, wherein the headstock assembly encloses the joining edges of the first side panel and the second side panel.

18. The motorcycle frame of claim 14, wherein the first side panel includes a reinforcing bridge extending from the top surface of the first side panel and the second side panel includes a reinforcing bridge extending from the top surface of the second side panel.

19. The motorcycle frame of claim 18, wherein the reinforcing bride of the first side panel and the reinforcing bridge of the second side panel are welded together.

20. A method of manufacturing a motorcycle frame comprising:
- providing a first side panel and a second side panel each including a top surface, a bottom surface, and a joining edge;
- welding together the joining edges of the first side panel and the second side panel;
- providing a headstock assembly including:
  - a top headstock portion comprising a top end, a bottom end, and a plurality of first extensions that extend from the top end of the top headstock portion towards a rear of the motorcycle frame;
  - a bottom headstock portion comprising a top end, a bottom end, and a plurality of second extensions that extend from the bottom end of the second tubular headstock portion towards the rear of the motorcycle frame;
- welding the plurality of first extensions of the top headstock portion to the top surface of the plurality of side panels;
- welding the plurality of second extensions of the bottom headstock portion to the bottom surface of the plurality of side panels; and
- welding the bottom end of the top headstock portion to the top end of the bottom headstock portion.

* * * * *

UNITED STATES PATENT AND TRADEMARK OFFICE
CERTIFICATE OF CORRECTION

| | | |
|---|---|---|
| PATENT NO. | : 9,434,441 B1 | Page 1 of 1 |
| APPLICATION NO. | : 14/823575 | |
| DATED | : August 11, 2015 | |
| INVENTOR(S) | : Jeff Waldo Sand | |

It is certified that error appears in the above-identified patent and that said Letters Patent is hereby corrected as shown below:

In the Claims

Claim 19, Line 2, replace "bride" with --bridge--.

Signed and Sealed this
Fourteenth Day of March, 2017

Michelle K. Lee
*Director of the United States Patent and Trademark Office*